US011240477B2

(12) United States Patent
Miao et al.

(10) Patent No.: US 11,240,477 B2
(45) Date of Patent: *Feb. 1, 2022

(54) METHOD AND DEVICE FOR IMAGE RECTIFICATION (71) Applicant: ARCSOFT CORPORATION LIMITED, Hangzhou (CN)

(72) Inventors: Wang Miao, Hangzhou (CN); Li Yu, Hangzhou (CN); Xin Fan, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,324

(22) Filed: Nov. 13, 2018

(65) Prior Publication Data
US 2019/0149798 A1 May 16, 2019

(30) Foreign Application Priority Data

Nov. 13, 2017 (CN) .......................... 201711114579.4

(51) Int. Cl.
*H04N 13/122* (2018.01)
*H04N 13/239* (2018.01)
*H04N 13/246* (2018.01)
*H04N 13/296* (2018.01)

(52) U.S. Cl.
CPC ......... *H04N 13/122* (2018.05); *H04N 13/239* (2018.05); *H04N 13/246* (2018.05); *H04N 13/296* (2018.05)

(58) Field of Classification Search
None
See application file for complete search history.

(56) References Cited

U.S. PATENT DOCUMENTS

| 6,175,648 | B1 * | 1/2001 | Ayache | G06K 9/20 348/42 |
| 6,674,892 | B1 * | 1/2004 | Melen | G06K 9/03 348/42 |
| 7,113,632 | B2 * | 9/2006 | Lee | G06K 9/03 382/154 |

(Continued)

OTHER PUBLICATIONS

P. Monasse, et al. "Three-Step Image Rectification", Proceedings of BMVC, pp. 89-10, Sep. 2010 (Year: 2010).*

(Continued)

*Primary Examiner* — Dave Czekaj
*Assistant Examiner* — Shanika M Brumfield
(74) *Attorney, Agent, or Firm* — Osha Bergman Watanabe & Burton LLP (57) ABSTRACT The present invention provides a method and a device for image rectification, which are applied in the field of image processing. The method includes: receiving two images, the two images are images of a target object captured from different viewpoints; performing an epipolar rectification on the two images; rectifying the two images after the epipolar rectification based on the image contents; and splicing the two images after the rectification based on the image contents. The method can rectify the images captured from different viewpoints, thereby ensuring the pixel alignment, and avoiding visual discomfort to the viewer.

14 Claims, 3 Drawing Sheets

(56) References Cited

U.S. PATENT DOCUMENTS

| | | | | |
|---|---|---|---|---|
| 7,957,581 B2* | 6/2011 | Wu | ............... | G06T 7/593 |
| | | | | 348/187 |
| 8,180,145 B2* | 5/2012 | Wu | ............... | G06T 7/596 |
| | | | | 382/103 |
| 8,792,727 B2* | 7/2014 | Inaba | ............... | G06K 9/4623 |
| | | | | 382/201 |
| 9,123,125 B2* | 9/2015 | Cheng | ............... | G06T 3/0093 |
| 10,349,040 B2* | 7/2019 | Goldentouch | ............... | G06T 7/85 |
| 2003/0072483 A1* | 4/2003 | Chen | ............... | G06K 9/32 |
| | | | | 382/154 |
| 2003/0156751 A1* | 8/2003 | Lee | ............... | H04N 13/111 |
| | | | | 382/154 |
| 2006/0078197 A1* | 4/2006 | Mitsumoto | ............... | G06K 9/209 |
| | | | | 382/154 |
| 2007/0296721 A1* | 12/2007 | Chang | ............... | G06T 15/10 |
| | | | | 345/427 |
| 2008/0310760 A1* | 12/2008 | Carlsen | ............... | G06T 3/0081 |
| | | | | 382/294 |
| 2009/0295907 A1* | 12/2009 | Kim | ............... | H04N 13/189 |
| | | | | 348/43 |
| 2011/0025825 A1* | 2/2011 | McNamer | ............... | G03B 35/06 |
| | | | | 348/46 |
| 2011/0080466 A1* | 4/2011 | Kask | ............... | G06T 5/006 |
| | | | | 348/43 |
| 2012/0141033 A1* | 6/2012 | Yu | ............... | G06K 9/00248 |
| | | | | 382/195 |
| 2013/0063572 A1* | 3/2013 | Ramachandra | ............... | H04N 13/128 |
| | | | | 348/47 |
| 2013/0129191 A1* | 5/2013 | Jin | ............... | H04N 13/122 |
| | | | | 382/154 |
| 2014/0049612 A1* | 2/2014 | Ishii | ............... | G01B 11/00 |
| | | | | 348/46 |
| 2014/0362179 A1* | 12/2014 | Lee | ............... | H04N 13/00 |
| | | | | 348/43 |
| 2016/0300383 A1* | 10/2016 | Liu | ............... | G06T 15/04 |
| 2017/0113611 A1* | 4/2017 | Thompson | ............... | H04N 5/23232 |
| 2018/0197320 A1* | 7/2018 | Lim | ............... | G06T 7/593 |
| 2018/0249088 A1* | 8/2018 | Chang | ............... | H04N 5/23216 |

OTHER PUBLICATIONS

R. I. Hartley. Theory and Practice of Projective Rectification. IJCV, 32(2): 115-127, 1999 (Year: 1999).*

\* cited by examiner

METHOD AND DEVICE FOR IMAGE RECTIFICATION

CROSS REFERENCE TO RELATED APPLICATIONS

This application is based upon and claims priority to Chinese Patent Application No. CN201711114579.4, filed on Nov. 13, 2017, the entire contents of which are incorporated herein by reference.

TECHNICAL FIELD

The present invention relates to a method and a device for image processing, and particularly to a method and a device for image rectification.

BACKGROUND

At present, two images corresponding to the line-of-sight of the left and right eyes are respectively collected in stereo image acquisition. Pixels in the two images need to align with each other in the no-parallax direction to achieve better visual effect. However, currently, the images of the left and right eyes acquired by a multi-view image acquisition device distort frequently, which makes it impossible to ensure the alignment of the pixels in the two images, thereby causing great visual discomfort to a viewer.

SUMMARY

The present invention provides a method and a device for image rectification, which can solve the problems that in the prior art, the captured images of left and right eyes distort frequently, which makes it impossible to ensure the alignment of the pixels in the two images, thereby causing great visual discomfort to a viewer.

In a first aspect, the present invention provides a method for image rectification which includes: receiving two images, wherein the two images are images of a target object captured from different viewpoints; performing an epipolar rectification on the two images; rectifying the two images after the epipolar rectification based on image contents; and splicing the two images rectified based on the image contents.

According to the first aspect of the present invention, for a first executable mode of the first aspect of the present invention, an image capturing device configured to capture the two images includes a first image capturing device and a second image capturing device. Rectifying the two images after the epipolar rectification based on image contents includes: determining positions of corresponding feature point pairs in the two images; and aligning the two images according to the positions of the feature point pairs and parameters of the first image capturing device and the second image capturing device.

According to the first executable mode of the first aspect of the present invention, for a second executable mode of the first aspect of the present invention, aligning the two images according to the positions of the feature point pairs and parameters of the first image capturing device and the second image capturing device includes: determining an error function relative to an obtained first parameter according to the positions of the feature point pairs and the parameters of the first image capturing device and the second image capturing device; obtaining optimized parameters of the first image capturing device and the second image capturing device according to the error function; and adjusting the two images according to the optimized parameters of the first image capturing device and the second image capturing device.

According to the first or second executable mode of the first aspect of the present invention, for a third executable mode of the first aspect of the present invention, determining the positions of the corresponding feature point pairs in the two images includes: determining positions of candidate corresponding feature point pairs in the two images; and removing feature point pairs having a wrong correspondence from the candidate corresponding feature point pairs.

According to any one of the first to third executable modes of the first aspect of the present invention, for a fourth executable mode of the first aspect of the present invention, feature points include one item listed below: points having variations in at least one direction greater than a first threshold, and points with unchanged locations independent of whether the sizes of the image change.

According to any one of the second to fourth executable modes of the first aspect of the present invention, for a fifth executable mode of the first aspect of the present invention, the error function includes a regularization term, wherein the regularization term is determined according to at least one of rotation-related parameters of the first image capturing device and the second image capturing device.

According to the fifth executable mode of the first aspect of the present invention, for a sixth executable mode of the first aspect of the present invention, the rotation-related parameters of the first image capturing device and the second image capturing device include Z-axis components of rotation matrices of the first image capturing device and the second image capturing device.

According to any one of the second to sixth executable modes of the first aspect of the present invention, for a seventh executable mode of the first aspect of the present invention, the feature point pair includes a first point and a second point; determining the error function relative to the obtained first parameter according to the positions of the feature point pairs and the parameters of the first image capturing device and the second image capturing device includes: projecting the first point to an image coordinate system of an image of the second point by a three-dimensional point cloud according to the parameters of the first image capturing device and the second image capturing device to obtain a projection point; and determining a distance between the projection point and the second point as the error function.

According to any one of the second to seventh executable modes of the first aspect of the present invention, for an eighth executable mode of the first aspect of the present invention, the optimized parameters of the first image capturing device and the second image capturing device include at least one item listed below: rotation parameters, focal lengths, and coordinates of principal points.

According to the first aspect of the present invention or any one of the first to eighth executable modes of the first aspect of the present invention, for a ninth executable mode of the first aspect of the present invention, the image capturing device configured to capture the two images includes the first image capturing device and the second image capturing device; performing the epipolar rectification on the two images includes: selecting a same focal length parameter for the first image capturing device and the second image capturing device; undistorting the two images according to the selected focal length parameter; determining a row alignment matrix of the two images in a no-parallax direction according to a translation matrix and the rotation matrix of the first image capturing device and the second image capturing device; and rectifying the two images according to the row alignment matrix in the no-parallax direction.

According to the first aspect of the present invention or any one of first to ninth executable modes of the first aspect of the present invention, for a tenth executable mode of the first aspect of the present invention, before splicing the two images rectified based on image contents, the method further includes: cropping parts of whole images of the two images or the whole images for splicing, according to the contents in the whole images, from the two images rectified based on the image contents.

In a second aspect, the present invention provides a device for image rectification which includes: a receiver configured to receive two images, wherein the two images are images of a target object captured from different viewpoints; a rectification processor configured to perform an epipolar rectification on the two images, wherein the rectification processor is further configured to rectify the two images after the epipolar rectification based on image contents; and a splicer configured to splice the two images rectified based on the image contents.

According to the second aspect of the present invention, for a first executable mode of the second aspect of the present invention, an image capturing device configured to capture the two images includes a first image capturing device and a second image capturing device. The rectification processor is specifically configured to determine positions of corresponding feature point pairs in the two images and align the two images according to the positions of the feature point pairs and parameters of the first image capturing device and the second image capturing device.

According to the first executable mode of the second aspect of the present invention, for a second executable mode of the second aspect of the present invention, the rectification processor is specifically configured to determine an error function relative to an obtained first parameter according to the positions of the feature point pairs and the parameters of the first image capturing device and the second image capturing device, obtain optimized parameters of the first image capturing device and the second image capturing device according to the error function, and adjust the two images according to the optimized parameters of the first image capturing device and the second image capturing device.

According to the second aspect of the present invention or any one of the first to second executable modes of the second aspect of the present invention, for a third executable mode of the second aspect of the present invention, the image capturing device configured to capture the two images includes the first image capturing device and the second image capturing device; and the rectification processor is specifically configured to select a same focal length parameter for the first image capturing device and the second image capturing device, undistort the two images according to the selected focal length parameter, determine a row alignment matrix of the two images in a no-parallax direction according to a translation matrix and the rotation matrix of the first image capturing device and the second image capturing device, and rectify the two images according to the row alignment matrix in the no-parallax direction.

According to the second aspect of the present invention or any one of the first to third executable modes of the second aspect of the present invention, for a fourth executable mode of the second aspect of the present invention, the splicer is further configured to crop parts of whole images of the two images or the whole images for splicing, according to the contents in the whole images, from the two images rectified based on the image contents, before splicing the two images rectified based on the image contents.

In a third aspect, the present invention provides a system for image rectification which includes a first image capturing device, a second image capturing device, and a first processor; wherein the first image capturing device and the second image capturing device are configured to capture images of a target object from different viewpoints; the first processor is configured to acquire the two images of the target object captured from the different viewpoints; and the first processor is further configured to perform an epipolar rectification on the two images, rectify the two images after the epipolar rectification based on image contents, and splice the two images rectified based on the image contents.

According to the third aspect of the present invention, for a first executable mode of the third aspect of the present invention, the first processor is specifically configured to determine the positions of corresponding feature point pairs in the two images, and align the two images according to the positions of the feature point pairs and parameters of the first image capturing device and the second image capturing device.

In a fourth aspect, the present invention provides a computer readable storage medium, which stores computer programs. When the computer programs are executed by a second processor, the steps of the methods described in the first aspect of the present invention and any one of the first to tenth executable modes of the first aspect of the present invention are implemented.

In a fifth aspect, the present invention provides a device for image rectification, which includes a memory, a third processor, and computer programs stored in the memory and operable on the third processor. When the computer programs are executed by the third processor, the steps of the methods described in the first aspect of the present invention and any one of the first to tenth executable modes of the first aspect of the present invention are implemented.

The present invention provides a method and a device for image rectification which can rectify the images captured from different viewpoints, thereby ensuring the alignment of pixels, and avoiding visual discomfort to the viewer.

DETAILED DESCRIPTION OF THE EMBODIMENTS

The technical solutions of the embodiments of the present invention will be described in detail hereinafter with reference to the drawings of the embodiments of the present invention.

The terms such as "first", "second", and the like, in the specification, claims, and drawings of the present invention are used to distinguish different objects rather than limit the objects to a specific order.

The term "and/or" in the embodiments of the present invention is merely used to describe an association relationship of associated objects, and it can indicate three cases. For example, A and/or B can be interpreted as three cases, i.e. only A, both A and B, or only B.

In the embodiments of the present invention, the words such as "exemplary" or "for example" etc. are used to indicate that examples, exemplifications, or illustrations are described. Any embodiment or designed solution described as "exemplary" or "for example" in the embodiments of the present invention should not be construed as more preferred or advantageous over other embodiments or designed solutions. Rather, the use of the words "exemplary" or "for example" etc. is intended to describe relevant concepts in a specific manner.

It should be noted that, for the sake of brevity and clarity of the drawings, the elements shown in the drawings are not necessarily drawn to scale. For example, the sizes of some elements may be enlarged relative to other elements for clarity. Further, where considered appropriate, reference numerals can be repeated over the drawings to indicate corresponding or similar elements.

The method and device for image rectification introduced by the present invention may be used for an image capturing device for generating a stereogram, such as a professional multi-position image capturing system, an image capturing system or terminal equipped with a plurality of image capturing devices, for example, a terminal equipped with dual image capturing device such as a dual-lens mobile phone or a dual-lens tablet computer.

Figure 1:
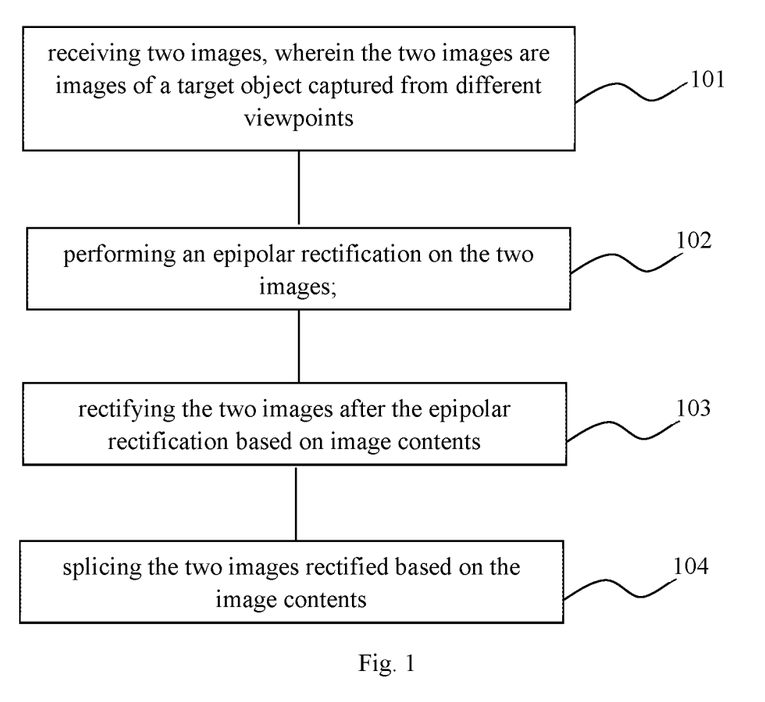
FIG. 1 is a flowchart of a method for image rectification according to embodiment one of the present invention.

A method for image rectification according to embodiment one of the present invention will be described in detail below with reference to FIG. 1. As shown in FIG. 1, the method includes the following steps.

Step 101: receiving two images, wherein the two images are images of a target object captured from different viewpoints.

The two images are respectively captured by a first image capturing device and a second image capturing device. The two images may be two of the multiple images of a target object. The two images may be ordinary two-dimensional images. The ordinary two-dimensional image includes a black-and-white image or a color image, and the color image may be a Red Green Blue (RGB) image.

Optionally, the receiving action described above may be receiving from a memory, and the memory may be a Random Access Memory (RAM), a Flash Memory, or a Read-Only Memory (ROM), etc.

Step 102: performing an epipolar rectification on the two images.

Performing the epipolar rectification on the two images includes: selecting a same focal length parameter for the first image capturing device and the second image capturing device, undistorting the two images according to the selected focal length parameter, determining a row alignment matrix of the two images in a no-parallax direction according to a translation matrix and a rotation matrix of the first image capturing device and the second image capturing device, and rectifying the two images according to the row alignment matrix in the no-parallax direction. Specifically, a new focal length is selected as a focal length for the first image capturing device and the second image capturing device. The new focal length may be a larger one selected from the focal lengths of the first image capturing device and the second image capturing device and used as the new focal length in the undistorting operation. In this way, after the undistorting operation, new coordinates of the principal points and the new focal length can be obtained. Since the same focal length is selected for the first image capturing device and the second image capturing device, it can be ensured that the images captured from different viewpoints have the same field of view after the undistortion without obvious scaling relationship. Subsequently, based on a translation matrix T and a rotation matrix R of the first image capturing device and the second image capturing device obtained through calibration, a relative attitude of the image capturing devices is rectified to a parallel state, thereby initially rectifying the images to an alignment state, and the corresponding calculation method is as follows.

Rotation vectors $e_1$, $e_2$ and $e_3 = e_1 \times e_2$ are established according to the translation matrix T, and an initial rotation matrix is expressed as below:

$$R_{rect} = \begin{bmatrix} e_1^T \\ e_2^T \\ e_3^T \end{bmatrix}.$$

Assuming that the Rodrigues form of the rotation matrix is $(n, \theta)$, each rotation matrix R obtained by calibration is rotated by a half based on the Rodrigues form. Namely, the two images described above are respectively rotated by $-\theta/2$ and $\theta/2$ along a rotation axis n, and the obtained corresponding rotation matrices are $r_1$ and $r_2$. Accordingly, the row alignment matrices of the two images described above in the no-parallax direction are as follows:

$$R_1 = R_{rect} r_1$$

$$R_2 = R_{rect} r_2.$$

Assuming that the coordinates of the two images described above are $(u_1, v_1)$ and $(u_2, v_2)$, respectively, the new coordinates $(u_{1new}', v_{1new}')$ and $(u_{2new}', v_{2new}')$ of the images after rectification can be calculated by the following formula:

$$\begin{bmatrix} u_1' \\ v_1' \\ z_1' \end{bmatrix} = R_1 \begin{bmatrix} u_1 \\ v_1 \\ 1 \end{bmatrix};$$

$$\begin{bmatrix} u_2' \\ v_2' \\ z_2' \end{bmatrix} = R_2 \begin{bmatrix} u_2 \\ v_2 \\ 1 \end{bmatrix};$$

$$u_{1new}' = u_1'/z_1'$$
$$v_{1new}' = v_1'/z_1';$$

-continued $$u'_{2new} = u'_2/z'_2$$
$$v'_{2new} = v'_2/z'_2.$$

In this case, the initial alignment calculation is completed.

Step 103: rectifying the two images after the epipolar rectification based on image contents.

Rectifying the two images after the epipolar rectification based on image contents includes: determining positions of corresponding feature point pairs in the two images and aligning the two images according to the positions of the feature point pairs and parameters of the first image capturing device and the second image capturing device. The term of corresponding means that like pixel points in the two images correspond to a part of the same target object. Optionally, the feature point includes at least one pixel point. The feature point includes one item listed below: a point having a variation in at least one direction greater than a first threshold, and a point with an unchanged location independent of whether the size of the image changes. In a word, the feature point can reflect the features of the content of the image.

Determining the positions of the corresponding feature point pairs in the two images includes: determining positions of the candidate corresponding feature point pairs in the two images, and removing feature point pairs having a wrong correspondence from the candidate corresponding feature point pairs. Specifically, a Random Sample Consensus (RANSAC) algorithm may be used to find out the above-mentioned feature point pairs having the wrong correspondence.

Further, aligning the two images according to the positions of the feature point pairs and parameters of the first image capturing device and the second image capturing device includes: determining an error function relative to an obtained first parameter according to the positions of the feature point pairs and the parameters of the first image capturing device and the second image capturing device; obtaining optimized parameters of the first image capturing device and the second image capturing device according to the error function; and adjusting the two images according to the optimized parameters of the first image capturing device and the second image capturing device. The feature point pair includes a first point and a second point. The above-mentioned error function relative to a first parameter may be an error between the first parameter calculated from the position of the first point and the parameter obtained by the calibration, and the first parameter calculated from the position of the second point and the parameter obtained by the calibration. The error function relative to the first parameter may also be a difference value between the value of the first parameter calculated according to the positions of the feature point pairs and the parameters of the first image capturing device and the second image capturing device, and the value of the actually measured first parameter. For example, the error function relative to the first parameter may be the distance between a projection point and the second point, and the projection point is obtained by projecting the first point to an image coordinate system of the image of the second point according to the parameters of the first image capturing device and the second image capturing device by a three-dimensional point cloud. Specifically, the above-mentioned projection process may include the following steps. The position of the first point is mapped to a point cloud in a three-dimensional coordinate system of the image capturing device corresponding to the first point. According to the calibrated external parameters between the image capturing device corresponding to the first point and the image capturing device corresponding to the second point, the point cloud is mapped to a three-dimensional coordinate system of the image capturing device corresponding to the second point, and then projected to a two-dimensional coordinate system of the image of the second point.

The error function includes a regularization term, and the regularization term is determined according to at least one of the rotation-related parameters of the first image capturing device and the second image capturing device. For example, the rotation-related parameter may be a rotation matrix. The rotation-related parameters of the first image capturing device and the second image capturing device include Z-axis components of the rotation matrices of the first image capturing device and the second image capturing device. The optimized parameters of the first image capturing device and the second image capturing device include at least one item listed below: rotation parameters, focal lengths, and coordinates of principal points.

Specifically, a matrix F is firstly defined as below:

$$F = (K_{L\_new} * R_{L\_opt} * K_{L\_old}^{-1})^T * [u1]_x * (K_{R\_new} * R_{R\_opt} * K_{R\_old}^{-1}).$$

Matrix $$[u1]_x = \begin{bmatrix} 0 & 0 & 0 \\ 0 & 0 & -1 \\ 0 & 1 & 0 \end{bmatrix}$$

is a constant matrix. F is a 3*3 matrix. $K_{L\_old}$ is an internal parameter of the first image capturing device and can be obtained by calibration. $K_{R\_old}$ is an internal parameter of the second image capturing device and can be obtained by calibration. The error function is processed to make the value of the error function minimal or converged, so as to obtain an optimized internal parameter $K_{L\_new}$ of the first image capturing device, an optimized internal parameter $K_{R\_new}$ of the second image capturing device, an optimized rotation matrix $$R_{L\_opt} = \begin{bmatrix} Rx\_l' \\ Ry\_l' \\ Rz\_l' \end{bmatrix}$$

of the first image capturing device, and an optimized rotation matrix $$R_{R\_opt} = \begin{bmatrix} Rx\_r' \\ Ry\_r' \\ Rz\_r' \end{bmatrix}$$

of the second image capturing device.

For each feature point pair, assuming that the coordinate of the feature point of the image captured by the first image capturing device is $$m_L = \begin{bmatrix} x_{L\_i} \\ y_{L\_i} \\ 1 \end{bmatrix},$$

the coordinate of the feature point of the image captured by the second image capturing device is $$m_R = \begin{bmatrix} x_{R\_i} \\ y_{R\_i} \\ 1 \end{bmatrix},$$

and defining a vector $$\vec{\beta} = \begin{bmatrix} 1 \\ 1 \\ 0 \end{bmatrix},$$

then the error function is defined as below:

$$\text{Cost} = \frac{m_L \cdot (F * m_R)}{\sqrt{\text{norm}((F * m_R) \cdot \vec{\beta}) + \text{norm}((F^T * m_L) \cdot \vec{\beta})}} + \alpha * (Rz\_l'^2 + Rz\_r'^2);$$

wherein $\alpha*(Rz\_l'^2+Rz\_r'^2)$ is the regularization term, and the a is α coefficient of the regularization term. It should be ensured that the rotation over the Z axis is not excessive while the value of the error function is minimal. The Z axis is the Z axis in the three-dimensional coordinate system of the first image capturing device and the second image capturing device described above.

After obtaining the optimized parameters, homography matrices $H_L$ and $H_R$ of the image captured by the first image capturing device and the image captured by the second image capturing device may be calculated, and the calculation formula is as follows:

$$H_L = K_{L\_new} * R_{L\_opt} * K_{L\_old}^{-1};$$

$$H_R = K_{R\_new} * R_{R\_opt} * K_{R\_old}^{-1}.$$

The homography matrices can be used to obtain new coordinate of a transformed image, as below:

$$\begin{bmatrix} x'_{new} \\ y'_{new} \\ z'_{new} \end{bmatrix} = H \begin{bmatrix} x_{old} \\ y_{old} \\ 1 \end{bmatrix};$$

wherein $x_{old}$ and $y_{old}$ are the coordinates of the images before optimization, the coordinates of the optimized images are $x_{new}=x'_{new}/z'_{new}$ and $y_{new}=y'_{new}/z'_{new}$. The H may be $H_L$ or $H_R$, and the corresponding coordinates may be the coordinates of the image captured by the first image capturing device or the image captured by the second image capturing device.

When the above-described row alignment matrices $R_1$ and $R_2$ are obtained, and the $H_L$ and $H_R$ are obtained, assuming that coordinates of the pixel points in the two received images are $u_{ori}$ and $v_{ori}$, and coordinates of the aligned images obtained after the final rectification are $u_{rec}$ and $v_{rec}$, then the formula is as follows:

$$\begin{bmatrix} u'_{rec} \\ v'_{rec} \\ w'_{rec} \end{bmatrix} = HR \begin{bmatrix} u_{ori} \\ v_{ori} \\ 1 \end{bmatrix}.$$

Accordingly, $u_{rec}=u'_{rec}/w'_{rec}$ and $v_{rec}=v'_{rec}/w'_{rec}$. For the image captured by the first image capturing device, H and R are $H_L$ and $R_1$. For the image captured by the second image capturing device, H and R are $H_R$ and $R_2$.

Step 104: splicing the two images rectified based on image contents.

Before splicing the two images rectified based on image contents, the method further includes: cropping parts of whole images of the two images or the whole images for splicing, according to the contents in the whole images, from the two images rectified based on the image contents.

Figure 2:
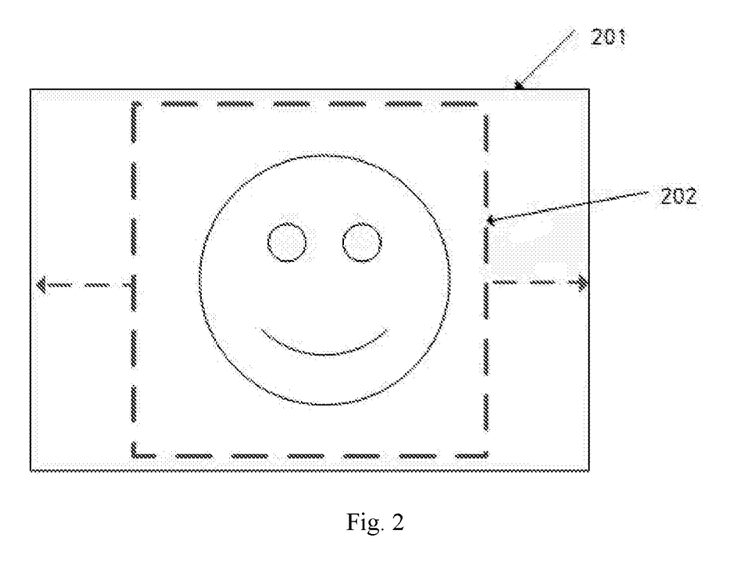
FIG. 2 is a schematic diagram showing a method for cropping images for stereo image splicing according to embodiment one of the present invention.

Specifically, as shown in FIG. 2, the reference numeral 201 indicates the rectified image, and the dotted frame indicated by the reference numeral 202 is used to adjust the range of the to-be-cropped area of the image for splicing, so as to generate a stereogram. The image area for splicing may be selected by adjusting the size and position of the dotted frame. In response to the change of the size and position of the dotted frame, the position of the content (e.g. the face) within the dotted frame changes relatively. This step can be used to adjust the relative positional relationship of the same content (such as the face) of the rectified image in the spliced image, thereby adjusting the 3D effect seen by the human eyes. The image areas cropped from the images captured from different viewpoints are output in a format of common stereogram, such as a side-by-side format (left-right splicing or up-down splicing), a red blue image, and the like.

The embodiment of the present invention provides a method for image rectification which can rectify the images captured from different viewpoints, thereby ensuring the pixel alignment, and avoiding visual discomfort to the viewer.

Figure 3:
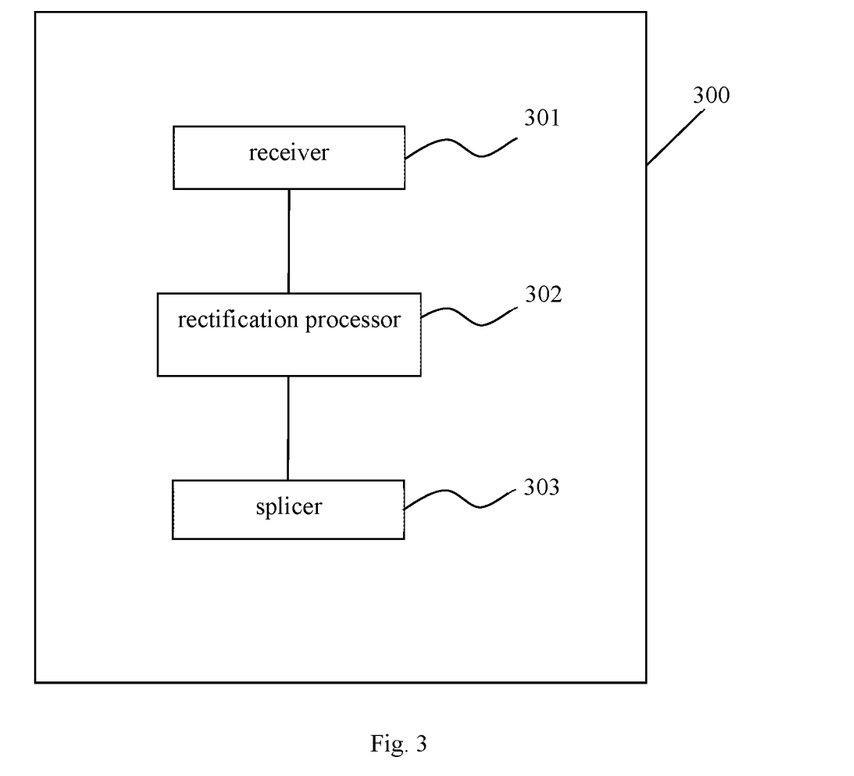
FIG. 3 is a structural diagram of a device for image rectification according to embodiment two of the present invention.

A device 300 for image rectification according to embodiment two of the present invention will be described in detail below with reference to FIG. 3. As shown in FIG. 3, the device 300 includes: a receiver 301, a rectification processor 302, and a splicer 303.

The receiver 301 is configured to receive two images. The two images are images of a target object captured from different viewpoints.

The two images are respectively captured by a first image capturing device and a second image capturing device. The two images may be two of the multiple images of a target object. The two images may be ordinary two-dimensional images. The ordinary two-dimensional image includes a black-and-white image or a color image, and the color image may be a Red Green Blue (RGB) image.

Optionally, the receiving action described above may be receiving from a memory, and the memory may be a Random Access Memory (RAM), a Flash Memory, or a Read-Only Memory (ROM), etc.

The rectification processor 302 is configured to perform an epipolar rectification on the two images.

For implementing this function, the rectification processor 302 is specifically configured to select a same focal length parameter for the first image capturing device and the second image capturing device, undistort the two images according to the selected focal length parameter, determine a row alignment matrix of the two images in a no-parallax direction according to a translation matrix and a rotation matrix of the first image capturing device and the second image capturing device, and rectify the two images according to the row alignment matrix in the no-parallax direction. Specifically, a new focal length is selected as the focal length for the first image capturing device and the second image capturing device. The new focal length may be a larger one selected from the focal lengths of the first image capturing device and the second image capturing device and used as the new focal length in the undistorting operation. In this way, after the undistorting operation, new coordinates of the principal points and the new focal length can be obtained. Since the same focal length is selected for the first image capturing device and the second image capturing device, it can be ensured that the images captured from different viewpoints have the same field of view after the undistortion without obvious scaling relationship. Subsequently, based on a translation matrix T and a rotation matrix R of the first image capturing device and the second image capturing device obtained through calibration, a relative attitude of the image capturing devices is rectified to a parallel state, thereby initially rectifying the images to an alignment state, and the corresponding calculation method is as follows:

Rotation vectors $e_1$, $e_2$ and $e_3 = e_1 \times e_2$ are established according to the translation matrix T, and an initial rotation matrix is expressed as below:

$$R_{rect} = \begin{bmatrix} e_1^T \\ e_2^T \\ e_3^T \end{bmatrix}.$$

Assuming that the Rodrigues form of the rotation matrix is (n, θ), each rotation matrix R obtained by calibration is rotated by a half based on the Rodrigues form. Namely, the two images described above are respectively rotated by −θ/2 and θ/2 along a rotation axis n, and the obtained corresponding rotation matrices are $r_1$ and $r_2$. Accordingly, the row alignment matrix of the two images described above in the no-parallax direction is as follows:

$$R_1 = R_{rect} r_1$$

$$R_2 = R_{rect} r_2.$$

Assuming that the coordinates of the two images described above are $(u_1, v_1)$ and $(u_2, v_2)$, respectively, the new coordinates $(u_{1new}', v_{1new}')$ and $(u_{2new}', v_{2new}')$ of the images after rectification can be calculated by the following formula:

$$\begin{bmatrix} u_1' \\ v_1' \\ z_1' \end{bmatrix} = R_1 \begin{bmatrix} u_1 \\ v_1 \\ 1 \end{bmatrix};$$

$$\begin{bmatrix} u_2' \\ v_2' \\ z_2' \end{bmatrix} = R_2 \begin{bmatrix} u_2 \\ v_2 \\ 1 \end{bmatrix};$$

$$u_{1new}' = u_1'/z_1'$$
$$v_{1new}' = v_1'/z_1';$$

$$u_{2new}' = u_2'/z_2'$$
$$v_{2new}' = v_2'/z_2'.$$

In this case, the initial alignment calculation is completed.

The rectification processor 302 is further configured to rectify the two images after the epipolar rectification based on the image contents.

For implementing this function, the rectification processor 302 is specifically configured to determine positions of corresponding feature point pairs in the two images, and align the two images according to the positions of the feature point pairs and parameters of the first image capturing device and the second image capturing device. The image capturing device configured to capture the two images includes the first image capturing device and the second image capturing device.

The term of corresponding means that like pixel points in the two images correspond to a part of the same target object. Optionally, the feature point includes at least one pixel point. The feature point includes one item listed below: a point having a variation in at least one direction greater than a first threshold, and a point with an unchanged location independent of whether the size of the image changes. In a word, the feature point can reflect the features of the content of the image.

The rectification processor is specifically configured to determine positions of the candidate corresponding feature point pairs in the two images, and remove feature point pairs having a wrong correspondence from the candidate corresponding feature point pairs. Specifically, a Random Sample Consensus (RANSAC) algorithm may be used to find out the above-mentioned feature point pairs having the wrong correspondence.

The rectification processor is specifically configured to determine an error function relative to an obtained first parameter according to the positions of the feature point pairs and the parameters of the first image capturing device and the second image capturing device; obtain optimized parameters of the first image capturing device and the second image capturing device according to the error function; and adjust the two images according to the optimized parameters of the first image capturing device and the second image capturing device. The feature point pair includes a first point and a second point. The above-mentioned error function relative to a first parameter may be an error between the first parameter calculated from the position of the first point and the parameter obtained by the calibration, and the first parameter calculated from the position of the second point and the parameter obtained by the calibration. The error function relative to the first parameter may also be a difference value between the value of the first parameter calculated according to the positions of the feature point pairs and the parameters of the first image capturing device and the second image capturing device, and the value of the actually measured first parameter. The rectification processor is specifically configured to project the first point to an image coordinate system of the image of the second point according to the parameters of the first image capturing device and the second image capturing device by a three-dimensional point cloud to obtain a projection point, and determine the distance between the projection point and the second point as the error function. Specifically, the above-mentioned projection process may include the following steps. The position of the first point is mapped to a point cloud in a three-dimensional coordinate system of the image capturing device corresponding to the first point. According to the calibrated external parameters between the image capturing device corresponding to the first point and the image capturing device corresponding to the second point, the point cloud is mapped to a three-dimensional coordinate system of the image capturing device corresponding to the second point, and then projected to a two-dimensional coordinate system of the image of the second point.

The error function includes a regularization term, and the regularization term is determined according to at least one of the rotation-related parameters of the first image capturing device and the second image capturing device. For example, the rotation-related parameter may be a rotation matrix. The rotation-related parameters of the first image capturing device and the second image capturing device include Z-axis components of the rotation matrices of the first image capturing device and the second image capturing device. The optimized parameters of the first image capturing device and the second image capturing device include at least one item listed below: rotation parameters, focal lengths, and coordinates of principal points.

Specifically, a matrix F is firstly defined as below:

$$F=(K_{L\_new}*R_{L\_opt}*K_{L\_old}^{-1})^{T}*[u1]_x*(K_{R\_new}*R_{R\_opt}*K_{R\_old}^{-1}).$$

Matrix $$[u1]_x = \begin{bmatrix} 0 & 0 & 0 \\ 0 & 0 & -1 \\ 0 & 1 & 0 \end{bmatrix}$$

is a constant matrix. F is a 3*3 matrix. $K_{L\_old}$ is an internal parameter of the first image capturing device and can be obtained by calibration. $K_{R\_old}$ is an internal parameter of the second image capturing device and can be obtained by calibration. The error function is processed to make the value of the error function minimal or converged, so as to obtain an optimized internal parameter $K_{L\_new}$ of the first image capturing device, an optimized internal parameter $K_{R\_new}$ of the second image capturing device, an optimized rotation matrix $$R_{L\_opt} = \begin{bmatrix} Rx\_l' \\ Ry\_l' \\ Rz\_l' \end{bmatrix}$$

of the first image capturing device, and an optimized rotation matrix $$R_{R\_opt} = \begin{bmatrix} Rx\_r' \\ Ry\_r' \\ Rz\_r' \end{bmatrix}$$

of the second image capturing device.

For each feature point pair, assuming that the coordinate of the feature point of the image captured by the first image capturing device is $$m_L = \begin{bmatrix} x_{L\_i} \\ y_{L\_i} \\ 1 \end{bmatrix},$$

the coordinate of the feature point of the image captured by the second image capturing device is $$m_R = \begin{bmatrix} x_{R\_i} \\ y_{R\_i} \\ 1 \end{bmatrix},$$

and defining a vector $$\vec{\beta} = \begin{bmatrix} 1 \\ 1 \\ 0 \end{bmatrix},$$

then the error function is defined as below:

$$\text{Cost} = \frac{m_L \cdot (F*m_R)}{\sqrt{\text{norm}((F*m_R)\cdot\vec{\beta}) + \text{norm}((F^T*m_L)\cdot\vec{\beta})}} + \alpha*(Rz\_l'^2 + Rz\_r'^2);$$

wherein $\alpha*(Rz\_l'^2+Rz\_r'^2)$ is the regularization term, and the $\alpha$ is a coefficient of the regularization term. It should be ensured that the rotation over the Z axis is not excessive while the value of the error function is minimal. The Z axis is the Z axis in the three-dimensional coordinate system of the first image capturing device and the second image capturing device described above.

After obtaining the optimized parameters, homography matrices $H_L$ and $H_R$ of the image captured by the first image capturing device and the image captured by the second image capturing device may be calculated, and the calculation formula is as follows:

$$H_L = K_{L\_new}*R_{L\_opt}*K_{L\_old}^{-1};$$

$$H_R = K_{R\_new}*R_{R\_opt}*K_{R\_old}^{-1}.$$

The homography matrices can be used to obtain new coordinate of a transformed image, as below:

$$\begin{bmatrix} x'_{new} \\ y'_{new} \\ z'_{new} \end{bmatrix} = H \begin{bmatrix} x_{old} \\ y_{old} \\ 1 \end{bmatrix};$$

wherein $x_{old}$ and $y_{old}$ are the coordinates of the images before optimization, the coordinates of the optimized images are $x_{new}=x'_{new}/z'_{new}$ and $y_{new}=y'_{new}/z'_{new}$. The H may be $H_L$ or $H_R$, and the corresponding coordinates may be the coordinates of the image captured by the first image capturing device or the image captured by the second image capturing device.

When the above-described row alignment matrices $R_1$ and $R_2$ are obtained, and the $H_L$ and $H_R$ are obtained, assuming that coordinates of the pixel points in the two received images are $u_{ori}$ and $v_{ori}$, and coordinates of the aligned images obtained after the final rectification are $u_{rec}$ and $v_{rec}$, then the formula is as follows:

$$\begin{bmatrix} u'_{rec} \\ v'_{rec} \\ w'_{rec} \end{bmatrix} = HR \begin{bmatrix} u_{ori} \\ v_{ori} \\ 1 \end{bmatrix}.$$

Accordingly, $u_{rec}=u'_{rec}/w'_{rec}$ and $v_{rec}=v'_{rec}/w'_{rec}$. For the image captured by the first image capturing device, H and R are $H_L$ and $R_1$. For the image captured by the second image capturing device, H and R are $H_R$ and $R_2$.

The splicer 303 is configured to splice the two images rectified based on image contents.

For implementing this function, the splicer is further configured to crop parts of whole images of the two images or the whole images for splicing, according to the contents in the whole images, from the two images rectified based on the image contents, before splicing the two images rectified based on image contents.

Specifically, as shown in FIG. 2, the reference numeral 201 indicates the rectified image, and the dotted frame indicated by the reference numeral 202 is used to adjust the range of the to-be-cropped area of the image for splicing, so as to generate a stereogram. The image area for splicing may be selected by adjusting the size and position of the dotted frame. In response to the change of the size and position of the dotted frame, the position of the content (e.g. the face) within the dotted frame changes relatively. This step can be used to adjust the relative positional relationship of the same content (such as the face) of the rectified image in the spliced image, thereby adjusting the 3D effect seen by the human eyes. The image areas cropped from the images captured from different viewpoints are output in a format of common stereogram, such as a side-by-side format (left-right splicing or up-down splicing), a red blue image, and the like.

The embodiment of the present invention provides a device for image rectification which can rectify the images captured from different viewpoints, thereby ensuring the pixel alignment, and avoiding visual discomfort to the viewer.

Figure 4:
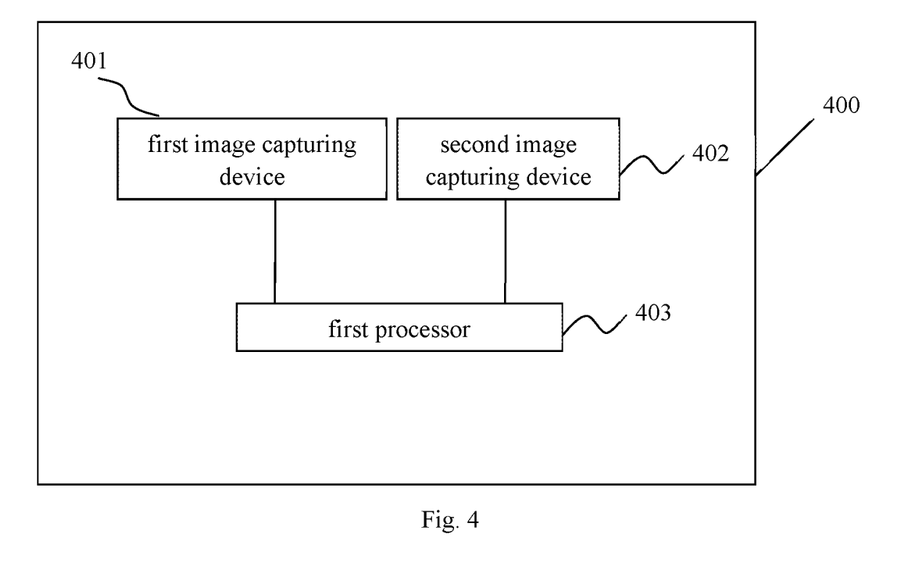
FIG. 4 is a structural diagram of a system for image rectification according to embodiment three of the present invention.

A system 400 for image rectification according to embodiment three of the present invention will be described in detail below with reference to FIG. 4. As shown in FIG. 4, the system 400 includes: a first image capturing device 401, a second image capturing device 402, and a first processor 403.

The first image capturing device 401 and the second image capturing device 402 are configured to capture images of a target object from different viewpoints.

The two images captured by the first image capturing device 401 and the second image capturing device 402 may be two of the multiple images of a target object. The two images may be ordinary two-dimensional images. The ordinary two-dimensional image includes a black-and-white image or a color image, and the color image may be a Red Green Blue (RGB) image.

The first processor 403 is configured to acquire the two images of the target object captured from different viewpoints.

Optionally, the acquiring action described above may be acquiring from a memory, and the memory may be a Random Access Memory (RAM), a Flash Memory, or a Read-Only Memory (ROM), etc.

The first processor 403 is further configured to perform an epipolar rectification on the two images, rectify the two images after the epipolar rectification based on image contents, and splice the two images rectified based on the image contents.

The first processor is specifically configured to select a same focal length parameter for the first image capturing device and the second image capturing device, undistort the two images according to the selected focal length parameter, determine a row alignment matrix of the two images in a no-parallax direction according to a translation matrix and a rotation matrix of the first image capturing device and the second image capturing device, and rectify the two images according to the row alignment matrix in the no-parallax direction. Specifically, a new focal length is selected as the focal length for the first image capturing device and the second image capturing device. The new focal length may be a larger one selected from the focal lengths of the first image capturing device and the second image capturing device and used as the new focal length in the undistorting operation. In this way, after the undistorting operation, new coordinates of the principal points and the new focal length can be obtained. Since the same focal length is selected for the first image capturing device and the second image capturing device, it can be ensured that the images captured from different viewpoints have the same field of view after the undistortion without obvious scaling relationship. Subsequently, based on a translation matrix T and a rotation matrix R of the first image capturing device and the second image capturing device obtained through calibration, a relative attitude of the image capturing devices is rectified to a parallel state, thereby initially rectifying the images to an alignment state, and the corresponding calculation method is as follows.

Rotation vectors $e_1$, $e_2$ and $e_3=e_1 \times e_2$ are established according to the translation matrix T, and an initial rotation matrix is expressed as below:

$$R_{rect} = \begin{bmatrix} e_1^T \\ e_2^T \\ e_3^T \end{bmatrix}.$$

Assuming that the Rodrigues form of the rotation matrix is $(n, \theta)$, each rotation matrix R obtained by calibration is rotated by a half based on the Rodrigues form. Namely, the two images described above are respectively rotated by $-\theta/2$ and $\theta/2$ along a rotation axis n, and the obtained corresponding rotation matrices are $r_1$ and $r_2$. Accordingly, the row alignment matrix of the two images described above in the no-parallax direction is as follows:

$$R_1 = R_{rect} r_1$$

$$R_2 = R_{rect} r_2.$$

Assuming that the coordinates of the two images described above are $(u_1, v_1)$ and $(u_2, v_2)$, respectively, the new coordinates $(u_{1new}', v_{1new}')$ and $(u_{2new}', v_{2new}')$ of the images after rectification can be calculated by the following formula:

$$\begin{bmatrix} u'_1 \\ v'_1 \\ z'_1 \end{bmatrix} = R_1 \begin{bmatrix} u_1 \\ v_1 \\ 1 \end{bmatrix};$$

-continued $$\begin{bmatrix} u'_2 \\ v'_2 \\ z'_2 \end{bmatrix} = R_2 \begin{bmatrix} u_2 \\ v_2 \\ 1 \end{bmatrix};$$

$$u'_{1new} = u'_1 / z'_1$$
$$v'_{1new} = v'_1 / z'_1$$
$$u'_{2new} = u'_2 / z'_2$$
$$v'_{2new} = v'_2 / z'_2$$

In this case, the initial alignment calculation is completed.

The first processor rectifies the two images after the epipolar rectification based on the image contents. The first processor is specifically configured to determine positions of corresponding feature point pairs in the two images, and align the two images according to the positions of the feature point pairs and parameters of the first image capturing device and the second image capturing device. The term of corresponding means that like pixel points in the two images correspond to a part of the same target object. Optionally, the feature point includes at least one pixel point. The feature point includes one item listed below: a point having a variation in at least one direction greater than a first threshold, and a point with an unchanged location independent of whether the size of the image changes. In a word, the feature point can reflect the features of the content of the image.

The first processor is specifically configured to determine positions of the candidate corresponding feature point pairs in the two images, and remove feature point pairs having a wrong correspondence from the candidate corresponding feature point pairs. Specifically, a Random Sample Consensus (RANSAC) algorithm may be used to find out the above-mentioned feature point pairs having the wrong correspondence.

Further, the first processor is specifically configured to determine an error function relative to an obtained first parameter according to the positions of the feature point pairs and the parameters of the first image capturing device and the second image capturing device; obtain optimized parameters of the first image capturing device and the second image capturing device according to the error function; and adjust the two images according to the optimized parameters of the first image capturing device and the second image capturing device. The feature point pair includes a first point and a second point. The above-mentioned error function relative to a first parameter may be an error between the first parameter calculated from the position of the first point and the parameter obtained by the calibration, and the first parameter calculated from the position of the second point and the parameter obtained by the calibration. The error function relative to the first parameter may also be a difference value between the value of the first parameter calculated according to the positions of the feature point pairs and the parameters of the first image capturing device and the second image capturing device, and the value of the actually measured first parameter. For example, the first processor is specifically configured to project the first point to an image coordinate system of the image of the second point according to the parameters of the first image capturing device and the second image capturing device by a three-dimensional point cloud to obtain a projection point, and determine the distance between the projection point and the second point as the error function. Specifically, the above-mentioned projection process may include the following steps. The position of the first point is mapped to a point cloud in a three-dimensional coordinate system of the image capturing device corresponding to the first point. According to the calibrated external parameters between the image capturing device corresponding to the first point and the image capturing device corresponding to the second point, the point cloud is mapped to a three-dimensional coordinate system of the image capturing device corresponding to the second point, and then projected to a two-dimensional coordinate system of the image of the second point.

The error function includes a regularization term, and the regularization term is determined according to at least one of the rotation-related parameters of the first image capturing device and the second image capturing device. For example, the rotation-related parameter may be a rotation matrix. The rotation-related parameters of the first image capturing device and the second image capturing device include Z-axis components of the rotation matrices of the first image capturing device and the second image capturing device. The optimized parameters of the first image capturing device and the second image capturing device include at least one item listed below: rotation parameters, focal lengths, and coordinates of principal points.

Specifically, a matrix F is firstly defined as below:

$$F = (K_{L\_new} * R_{L\_opt} * K_{L\_old}^{-1})^{T} * [u1]_x * (K_{R\_new} * R_{R\_opt} * K_{R\_old}^{-1}).$$

Matrix $$[u1]_x = \begin{bmatrix} 0 & 0 & 0 \\ 0 & 0 & -1 \\ 0 & 1 & 0 \end{bmatrix}$$

is a constant matrix. F is a 3*3 matrix. $K_{L\_old}$ is an internal parameter of the first image capturing device and can be obtained by calibration. $K_{R\_old}$ is an internal parameter of the second image capturing device and can be obtained by calibration. The error function is processed to make the value of the error function minimal or converged, so as to obtain an optimized internal parameter $K_{L\_new}$ of the first image capturing device, an optimized internal parameter $K_{R\_new}$ of the second image capturing device, an optimized rotation matrix $$R_{L\_opt} = \begin{bmatrix} Rx\_l' \\ Ry\_l' \\ Rz\_l' \end{bmatrix}$$

of the first image capturing device, and an optimized rotation matrix $$R_{R\_opt} = \begin{bmatrix} Rx\_r' \\ Ry\_r' \\ Rz\_r' \end{bmatrix}$$

of the second image capturing device.

For each feature point pair, assuming that the coordinate of the feature point of the image captured by the first image capturing device is $$m_L = \begin{bmatrix} x_{L\_i} \\ y_{L\_i} \\ 1 \end{bmatrix},$$

the coordinate of the feature point of the image captured by the second image capturing device is $$m_R = \begin{bmatrix} x_{R\_i} \\ y_{R\_i} \\ 1 \end{bmatrix},$$

and defining a vector $$\vec{\beta} = \begin{bmatrix} 1 \\ 1 \\ 0 \end{bmatrix},$$

then the error function is defined as below:

$$\text{Cost} = \frac{m_L \cdot (F * m_R)}{\sqrt{\text{norm}((F * m_R) \cdot \vec{\beta}) + \text{norm}((F^T * m_L) \cdot \vec{\beta})}} + \alpha * (Rz\_l'^2 + Rz\_r'^2);$$

wherein $\alpha*(Rz\_l'^2+Rz\_r'^2)$ is the regularization term, and the $\alpha$ is a coefficient of the regularization term. It should be ensured that the rotation over the Z axis is not excessive while the value of the error function is minimal. The Z axis is the Z axis in the three-dimensional coordinate system of the first image capturing device and the second image capturing device described above.

After obtaining the optimized parameters, homography matrices $H_L$ and $H_R$ of the image captured by the first image capturing device and the image captured by the second image capturing device may be calculated, and the calculation formula is as follows:

$$H_L = K_{L\_new} * R_{L\_opt} * K_{L\_old}^{-1};$$

$$H_R = K_{R\_new} * R_{R\_opt} * K_{R\_old}^{-1}.$$

The homography matrices can be used to obtain new coordinate of a transformed image, as below:

$$\begin{bmatrix} x'_{new} \\ y'_{new} \\ z'_{new} \end{bmatrix} = H \begin{bmatrix} x_{old} \\ y_{old} \\ 1 \end{bmatrix};$$

wherein $x_{old}$ and $y_{old}$ are the coordinates of the images before optimization, the coordinates of the optimized images are $x_{new} = x'_{new}/z'_{new}$ and $y_{new} = y'_{new}/z'_{new}$. The H may be $H_L$ or $H_R$, and the corresponding coordinates may be the coordinates of the image captured by the first image capturing device or the image captured by the second image capturing device.

When the above-described row alignment matrices $R_1$ and $R_2$ are obtained, and the $H_L$ and $H_R$ are obtained, assuming that coordinates of the pixel points in the two received images are $u_{ori}$ and $v_{ori}$, and coordinates of the aligned images obtained after the final rectification are $u_{rec}$ and $v_{rec}$, then the formula is as follows:

$$\begin{bmatrix} u'_{rec} \\ v'_{rec} \\ w'_{rec} \end{bmatrix} = HR \begin{bmatrix} u_{ori} \\ v_{ori} \\ 1 \end{bmatrix}.$$

Accordingly, $u_{rec}=u'_{rec}/w'_{rec}$ and $v_{rec}=v'_{rec}/w'_{rec}$. For the image captured by the first image capturing device, H and R are $H_L$ and $R_1$. For the image captured by the second image capturing device, H and R are $H_R$ and $R_2$.

The first processor is further configured to crop parts of whole images of the two images or the whole images for splicing, according to the contents in the whole images, from the two images rectified based on the image contents, before splicing the two images rectified based on image contents.

Specifically, as shown in FIG. 2, the reference numeral 201 indicates the rectified image, and the dotted frame indicated by the reference numeral 202 is used to adjust the range of the to-be-cropped area of the image for splicing, so as to generate a stereogram. The image area for splicing may be selected by adjusting the size and position of the dotted frame. In response to the change of the size and position of the dotted frame, the position of the content (e.g. the face) within the dotted frame changes relatively. This step can be used to adjust the relative positional relationship of the same content (such as the face) of the rectified image in the spliced image, thereby adjusting the 3D effect seen by the human eyes. The image areas cropped from the images captured from different viewpoints are output in a format of common stereogram, such as a side-by-side format (left-right splicing or up-down splicing), a red blue image, and the like.

The embodiment of the present invention provides a system for image rectification which can rectify the images captured from different viewpoints, thereby ensuring the pixel alignment, and avoiding visual discomfort to the viewer.

Figure 5:
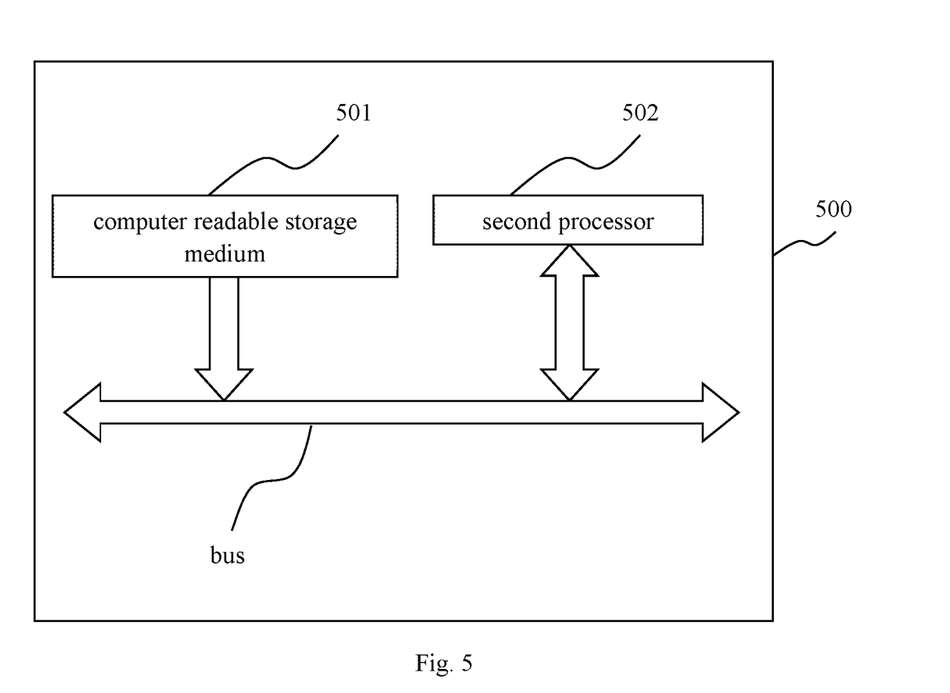
FIG. 5 is a structural diagram of a device for image rectification according to embodiment four of the present invention.

A device for image rectification 500 according to embodiment four of the present invention will be described in detail below with reference to FIG. 5. The device 500 includes a computer readable storage medium 501 which stores computer programs. When the computer programs are executed by a second processor 502, the steps of the methods in the embodiment one are implemented. As shown in FIG. 5, optionally, the device 500 may include a bus.

For descriptions related to the function of the components in this embodiment, the first, second, or third embodiment may be taken for reference.

The embodiment of the present invention provides a device for image rectification which can rectify the images captured from different viewpoints, thereby ensuring the pixel alignment, and avoiding visual discomfort to the viewer.

Figure 6:
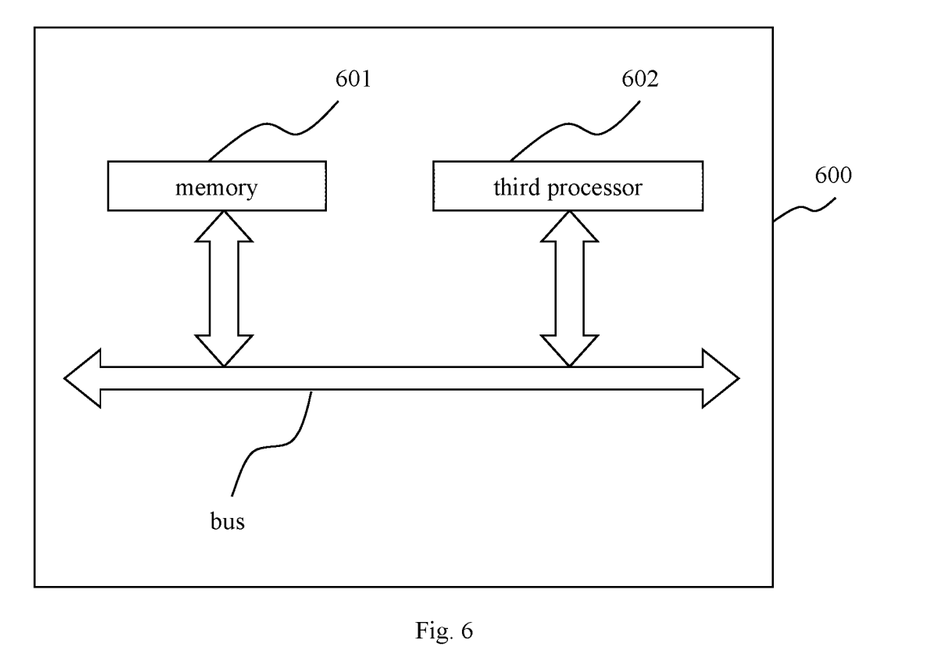
FIG. 6 is a structural diagram of a device for image rectification according to embodiment five of the present invention.

A device for image rectification 600 according to embodiment five of the present invention will be described in detail below with reference to FIG. 6. The device 600 includes a memory 601, a third processor 602, and computer programs stored in the memory 601 and operable on the third processor 602. When the computer programs are executed by the third processor 602, the steps of the methods in the embodiment one are implemented. Optionally, as shown in FIG. 6, the device 600 further includes a bus.

The embodiment of the present invention provides a device for image rectification which can rectify the images captured from different viewpoints, thereby ensuring the pixel alignment, and avoiding visual discomfort to the viewer.

Exemplarily, the computer programs may be divided into one or more modules/units that are stored in the memory and executed by the processor to perform the present invention. The one or more modules/units may be a series of computer program instruction segments capable of performing specific functions, and the instruction segments are used to describe the execution process of the computer programs in the device/terminal device.

The device/terminal device may be a computing device such as a mobile phone, a tablet computer, a desktop computer, a laptop, a palmtop computer, a cloud server and the like. The device/terminal device may include, but not limited to, a processor and a memory. It will be understood by those skilled in the art that the schematic diagram of the present invention merely shows an example of the device/terminal device which does not limit the device/terminal device. The device/terminal device may include more or less components than those shown in the drawings, a combination of certain components, or different components shown in the drawings. For example, the device/terminal device may further include an input/output device, a network access device, a bus, and the like.

The above-mentioned processor may be a central processing unit (CPU), or may be another general purpose processor, such as a digital signal processor (DSP), an application specific integrated circuit (ASIC), a field-programmable gate array (FPGA), or other programmable logic device, such as a discrete or transistor logic device, a discrete hardware component, and the like. The general-purpose processor may be a microprocessor or any conventional processor etc. The processor is a control center of the device/terminal device, which connects various parts of the entire device/terminal device by various interfaces and lines.

The memory may be used to store the computer programs and/or modules. The processor realizes various functions of the device/terminal device by running or executing the computer programs and/or modules stored in the memory and invoking data stored in the memory. The memory may include a program storage area and a data storage area. In detail, the program storage area may store an operating system, an application required to realize at least one function (such as an image playing function, etc.), and the like. The data storage area may store data (such as video data, images, etc.) created during the use of the mobile phone, etc. In addition, the memory may include a high-speed random-access memory. Also, the memory may include a non-volatile memory, such as hard disk, memory, plug-in hard disk, smart media card (SMC), secure digital (SD) card, flash card, and at least one disk storage device, flash memory device, or other volatile solid memory devices.

The modules/units integrated by the device/terminal device can be stored in a computer readable storage medium if they are implemented in the form of software functional units and sold or used as a stand-alone product. Based on such understanding, implementation of all or part of the processes of the methods according to the above-mentioned embodiments of the present invention can also be realized by computer programs which instruct related hardware. The computer programs may be stored in a computer readable storage medium. When the computer programs are executed by the processor, the steps of the various methods according to the above-mentioned embodiments can be implemented. In detail, the computer programs include computer program code, which may be in the forms of source code, object code, executable file, or some intermediate forms etc. The computer readable storage medium may include: any solid or device capable of carrying the computer program codes, recording medium, USB flash disk, removable hard disk, magnetic disk, optical disk, computer memory, read-only memory (ROM), random access memory (RAM), electrical carrier signal, telecommunication signal, and software distribution medium, etc.

The imaging of the target object in the above-mentioned embodiments may be local or integral imaging. Both of the local and integral imaging are suitable for the method or device provided by the present invention. Or, the local or integral imaging will be suitable for the method or device provided by the present invention after some corresponding modifications. These modifications can be derived by those of ordinary skill in the art without creative efforts, so they should be considered as falling within the scope of the present invention.

What is claimed is:

1. A method for image rectification, comprising:
receiving two images captured by a first image capturing device and a second image capturing device, wherein the two images are images of a target object captured from different viewpoints;
performing an epipolar rectification on the two images;
selecting a same focal length parameter for the first image capturing device and the second image capturing device, wherein the two images captured from the different viewpoints have a same field of view after an undistortion without a scaling relationship;
rectifying the two images after the epipolar rectification based on image contents; and
splicing the two images rectified based on the image contents,
wherein rectifying the two images comprises determining positions of feature point pairs corresponding in the two images by:
determining positions of candidate feature point pairs corresponding in the two images;
removing feature point pairs having a wrong correspondence from the candidate feature point pairs using a Random Sample Consensus (RANSAC) algorithm; and
aligning the two images according to the positions of the feature point pairs and parameters of the first image capturing device and the second image capturing device,
wherein aligning the two images according to the positions of the feature point pairs and the parameters of the first image capturing device and the second image capturing device comprises:
determining an error function relative to an obtained first parameter according to the positions of the feature point pairs and the parameters of the first image capturing device and the second image capturing device;
obtaining optimized parameters of the first image capturing device and the second image capturing device according to the error function; and
adjusting the two images according to the optimized parameters of the first image capturing device and the second image capturing device,
wherein each feature point pair comprises a first point and a second point,
wherein determining the error function relative to the obtained first parameter according to the positions of the feature point pairs and the parameters of the first image capturing device and the second image capturing device comprises:

projecting the first point to an image coordinate system of an image of the second point by a three-dimensional point cloud according to the parameters of the first image capturing device and the second image capturing device to obtain a projection point; and determining a distance between the projection point and the second point as the error function, and wherein the error function comprises a regularization term, and wherein the regularization term is determined by a multiplication of a coefficient and a sum of squares of a pair of predetermined rotation-related parameters from the first image capturing device and the second image capturing device.

2. The method of claim 1, wherein feature points of the feature point pairs comprise one item listed below:

points having variations in at least one direction greater than a first threshold; and points with unchanged locations independent of whether the sizes of the images change.

3. The method of claim 1, wherein the pair of predetermined rotation-related parameters correspond to an axis in a three-dimensional coordinate system, and wherein the regularization term is determined to ensure not excessive rotation over the axis when the error function is minimal.

4. The method of claim 3, wherein the axis is Z-axis.

5. The method of claim 1, wherein the optimized parameters of the first image capturing device and the second image capturing device comprise at least one item listed below:

rotation parameters, focal lengths, and coordinates of principal points.

6. The method of claim 1, wherein performing the epipolar rectification on the two images comprises:

undistorting the two images according to the selected focal length parameter;

determining a row alignment matrix of the two images in a no-parallax direction according to a translation matrix and a rotation matrix of the first image capturing device and the second image capturing device; and rectifying the two images according to the row alignment matrix in the no-parallax direction.

7. The method of claim 1, wherein before splicing the two images rectified based on image contents, the method further comprises:

cropping parts of whole images of the two images or the whole images for splicing, according to contents in the whole images, from the two images rectified based on the image contents.

8. A non-transitory computer readable storage medium storing computer programs, wherein when the computer programs are executed by a second processor, the steps of the method of claim 1 are implemented.

9. A device for image rectification, comprising a memory, a third processor, and computer programs stored in the memory and operable on the third processor, wherein when the computer programs are executed by the third processor, the steps of the method of claim 1 are implemented.

10. A device for image rectification, comprising:

a receiver, configured to receive two images, wherein the two images are images of a target object captured from different viewpoints;

a first image capturing device having a first focal length parameter and a second image capturing device having a second focal length parameter, wherein the first focal length parameter and the second focal length parameter are the same, wherein the two images captured from the different viewpoints have a same field of view after an undistortion without a scaling relationship, and wherein the first image capturing device and the second image capturing device capture the first image and the second image;

a rectification processor configured to perform an epipolar rectification on the two images, determine positions of feature point pairs corresponding in the two images, and rectify the two images after the epipolar rectification based on image contents; and a splicer, configured to splice the two images rectified based on the image contents, wherein the rectification processor determines positions of feature point pairs corresponding in the two images by:

determining positions of candidate feature point pairs corresponding in the two images; and removing feature point pairs having a wrong correspondence from the candidate feature point pairs using a Random Sample Consensus (RANSAC) algorithm, wherein the rectification processor aligns the two images according to the positions of the feature point pairs and parameters of the first image capturing device and the second image capturing device, wherein each feature point pair comprises a first point and a second point, wherein the rectification processor determines an error function relative to an obtained first parameter according to the positions of the feature point pairs and the parameters of the first image capturing device and the second image capturing device by:

projecting the first point to an image coordinate system of an image of the second point by a three-dimensional point cloud according to the parameters of the first image capturing device and the second image capturing device to obtain a projection point; and determining a distance between the projection point and the second point as the error function, wherein the rectification processor obtains optimized parameters of the first image capturing device and the second image capturing device according to the error function, wherein the rectification processors adjust the two images according to the optimized parameters of the first image capturing device and the second image capturing device, wherein the error function comprises a regularization term, and wherein the regularization term is determined by a multiplication of a coefficient and a sum of squares of a pair of predetermined rotation-related parameters from the first image capturing device and the second image capturing device.

11. The device of claim 10, wherein the rectification processor is configured to:

determine an error function relative to an obtained first parameter according to the positions of the feature point pairs and the parameters of the first image capturing device and the second image capturing device, obtain optimized parameters of the first image capturing device and the second image capturing device according to the error function, and adjust the two images according to the optimized parameters of the first image capturing device and the second image capturing device.

12. The device of claim 10 wherein
the rectification processor is configured to undistort the two images according to a selected focal length parameter, determine a row alignment matrix of the two images in a no-parallax direction according to a translation matrix and the rotation matrix of the first image capturing device and the second image capturing device, and rectify the two images according to the row alignment matrix in the no-parallax direction.

13. The device of claim 10, wherein
the splicer is further configured to crop parts of whole images of the two images or the whole images for splicing, according to contents in the whole images, from the two images rectified based on the image contents, before splicing the two images rectified based on the image contents.

14. A system for image rectification, comprising: a first image capturing device, a second image capturing device, and a first processor; wherein
the first image capturing device and the second image capturing device are configured to capture images of a target object from different viewpoints and have a same focal length parameter;
the first processor is configured to acquire the two images of the target object captured from the different viewpoints and determine positions of feature point pairs corresponding in the two images;
the two images captured from the different viewpoints have a same field of view after an undistortion without a scaling relationship; and
the first processor is further configured to perform an epipolar rectification on the two images, rectify the two images after the epipolar rectification based on image contents, and splice the two images rectified based on the image contents,
wherein the first processor determines positions of feature point pairs corresponding in the two images by:
  determining positions of candidate feature point pairs corresponding in the two images; and
  removing feature point pairs having a wrong correspondence from the candidate feature point pairs using a Random Sample Consensus (RANSAC) algorithm,
wherein the first processor aligns the two images according to the positions of the feature point pairs and parameters of the first image capturing device and the second image capturing device,
wherein each feature point pair comprises a first point and a second point,
wherein the first processor determines an error function relative to an obtained first parameter according to the positions of the feature point pairs and the parameters of the first image capturing device and the second image capturing device by:
  projecting the first point to an image coordinate system of an image of the second point by a three-dimensional point cloud according to the parameters of the first image capturing device and the second image capturing device to obtain a projection point; and
  determining a distance between the projection point and the second point as the error function,
wherein the first processor obtains optimized parameters of the first image capturing device and the second image capturing device according to the error function,
wherein the first processors adjust the two images according to the optimized parameters of the first image capturing device and the second image capturing device,
wherein the error function comprises a regularization term, and
wherein the regularization term is determined by a multiplication of a coefficient and a sum of squares of a pair of predetermined rotation-related parameters from the first image capturing device and the second image capturing device.

* * * * *